Sept. 13, 1932.  B. D. MICKEY  1,877,681

PARALLEL OPERATION OF DIRECT CURRENT MOTORS

Filed Sept. 14, 1931

Inventor:
Bruce D. Mickey,
by Chas. W. Mullen
His Attorney

Patented Sept. 13, 1932

1,877,681

UNITED STATES PATENT OFFICE

BRUCE D. MICKEY, OF SCHENECTADY, NEW YORK, ASSIGNOR TO GENERAL ELECTRIC COMPANY, A CORPORATION OF NEW YORK

PARALLEL OPERATION OF DIRECT CURRENT MOTORS

Application filed September 14, 1931. Serial No. 562,713.

My invention relates to the parallel operation of mechanically connected direct current motors, and has for an object the provision of a simple and reliable means for insuring an equal division of load between the motors.

My invention is particularly applicable to Ward-Leonard control systems for rolling mill drives or for elevator drives, where a plurality of speeds in both directions is desired for different operating conditions. A pair of motors operating in parallel greatly decreases the motor inertia and consequently greater rates of acceleration and retardation may be obtained.

In carrying out my invention in one form, I provide for the generation of a voltage proportional to the difference in load current flowing through the armatures of the motors and arranged to produce a magnetomotive force on each of the motors in a direction to increase or decrease the magnetic flux of the particular motor to correct for any unbalance in the load distribution between the motors. More specifically I provide an auxiliary generator with a pair of field windings each of which is connected in series with a particular motor armature. The armature of the auxiliary generator is connected in series with an additional field winding on each of the motors one being arranged to increase the excitation of the motor, and the other being arranged to decrease the excitation. Any difference in load current which flows through the armatures of the motors causes the auxiliary generator to produce a voltage which increases or diminishes the excitation of a particular motor, causing it to vary its output and to maintain an equal distribution of the load between the motors.

Figure 1:
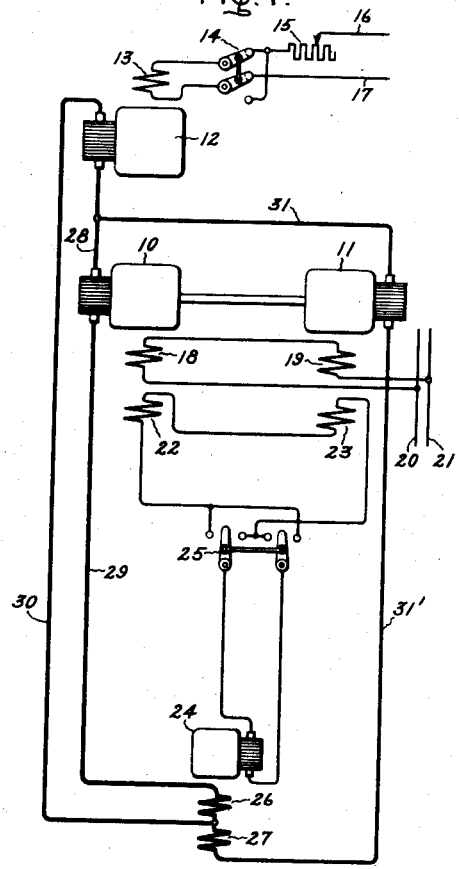
Figure 2:
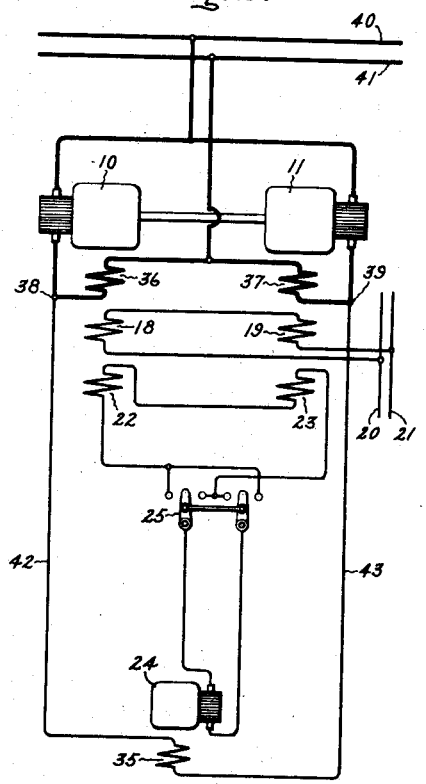
Figure 3:
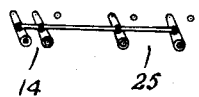

For a more complete understanding of my invention reference should now be had to the drawing, in which Fig. 1 shows a simplified system embodying my invention, while Fig. 2 shows a modification of Fig. 1. Fig. 3 is a detail view of the controlling switches.

Referring to the drawing, I have shown my invention in one form as applied to the direct current motors 10 and 11, whose armatures are mounted on the same driving shaft. A Ward-Leonard control is provided by a generator 12 whose armature is connected in local circuit with the motors. A field winding 13 provided on the generator is connected through a direction controlling switch 14 and a speed controlling resistance 15 to a suitable source of direct current supply, as is indicated by the supply lines 16 and 17. The motor 10 is provided with a field winding 18 which is connected in series with a similar field winding 19 provided on the motor 11, the field winding being energized from a suitable source of direct current supply as is indicated by the supply lines 20 and 21. To provide a constant load division between the two motors, additional field windings 22 and 23 are respectively provided on the motors 10 and 11, and are arranged to be connected to an auxiliary generator 24 through a reversing switch 25. The field windings 22 and 23 are arranged to increase the excitation of one motor while decreasing the excitation of the other motor. There is connected in series with the armature circuits of the respective motors series fields 26 and 27 differentially related so that the voltage generated by the auxiliary generator 24 is always proportional to the difference in load current which flows through these windings.

In explaining the operation of my invention, it will be assumed that the generators 12 and 24 are being rotated at constant speed by a suitable prime mover, (not shown) and that the motor field windings 18 and 19 are energized from the supply lines 20 and 21. It will also be assumed that the direction controlling switch 14 has been operated to the position shown so that the generator field winding 13 provides excitation for the generator 12 in a direction to cause the lower armature brush to be of positive polarity. Current may then flow by conductor 28 to the armature of the motor 10, and by conductor 29, series field 26, conductor 30 to the other side of the generator armature. Similarly, current is supplied by conductor 31 through the armature of the motor 11, conductor 31', series field 27 and by conductor 30 to the other side of the generator armature. If the motor 10 carries more than its proper proportion of the load, the current through the series winding 26 becomes greater than the current through the series winding 27 which causes a magnetomotive force to be produced upon the generator 24 and a consequent generation of voltage. The reversing switch 25 is then moved to the left so that the voltage produced will cause a current to flow through the winding 22 tending to strengthen the field of the motor 10 and to weaken the field of the motor 11. The result is that the motor 10 decreases the load it is carrying while the motor 11 increases its load and it will of course be understood that this shifting of load continues until the ratio of the load carried by the motors returns to its predetermined value. However, the generation of the corrective voltage is dependent on a certain amount of unbalanced load between the motors. Therefore, for motors of the same capacity the load carried by each motor will not be exactly the same though a substantially equal division of load is obtained.

Assuming now that the motor 11 carries more than its proportionate amount of the load, it follows that the series field winding 27 overcomes the effect of the series winding 26 and causes a voltage to be produced by the auxiliary generator 24 in a direction opposite to the voltage caused by the field winding 26 as described in the preceding paragraph. Current is thereupon caused to flow through the field winding 23 of the motor 11 in a direction to increase the excitation of the motor 11, and through the field winding 22 in a direction to reduce the excitation. As before, the ratio of the load carried by the motors 10 and 11 is returned to its predetermined value.

Assuming now that the direction of rotation of the motor is reversed by reversing the polarity of the generator 12 by means of the direction controlling switch 14, it follows at once that current is then supplied to the motors 10 and 11 from the upper armature brush, conductor 30, series field winding 26 to the armature of motor 10 and by conductor 28 to the other side of the generator armature and similarly by conductor 30, series field winding 27, conductor 31', the armature of motor 11, and by conductor 31 to the other side of the generator armature. It will be observed that the relative direction of current flow through the series field windings 26 and 27 is reversed with respect to the current flow for the opposite direction of rotation of the motors. It thereupon becomes necessary to operate the reversing switch to its right hand position to reverse the current flow through the windings 22 and 23 so that the magnetomotive forces produced by the field windings 22 and 23 will be in the correct direction to maintain the load division between the motors constant. The reversing switch 25 is preferably operated with the direction controlling switch 14 as shown in Fig. 3 so that the polarity of the current supplied to the windings 22 and 23 is caused to be correct for either direction of rotation.

In the modification shown in Fig. 2 the auxiliary generator 24 is energized by a single field winding 35 which is energized in accordance with the potential drop across a pair of line resistances, each of which is connected in series with the armature of one of the motors. As shown, the resistance 36 for the motor 10 is provided by the commutating field and/or compensating windings of motor 10, and similarly the resistance 37 in series with the armature of the motor 11 is provided by its commutating and/or compensating windings. By utilizing these windings for the line resistances, I eliminate the $I^2R$ losses incident to the use of additional resistances connected in the armature circuit.

Again assuming that the motors 10 and 11 are of equal capacity and have similar operating characteristics, it will be observed that for an equal division of load the armature current of each motor will be the same and consequently no potential difference exists between the points 38 and 39. However, if the motor 10 carries more than its proportion of the load, a greater current may flow from the supply line 40 through the armature of motor 10 and the field winding 36 than flows from the supply line 40 through the armature of motor 11 and the field winding 37. Consequently a potential difference exists between the points 38 and 39 and current flows by conductors 42 and 43 through the field winding 35. The result is a generation of voltage by the auxiliary generator 24 which acts as in the case of Fig. 1 to return the division of load between the motors to the predetermined ratio. The reversing switch 25 is operated as described in connection with Fig. 1 and the operation of the modification of Fig. 2 is equally applicable to varying loads on the motors 10 and 11 and for different speeds as well as for reverse operations for varying loads and speeds.

If the capacities of the two machines are unequal it will of course be understood that the relative values of the resistances 36 and 37 will be proportioned so that each motor will carry its correct share of the load. If the motor 10 is of less capacity than the motor 11, then the resistance 36 is proportioned so that the potential difference between the points 38 and 39 is equal when each of the motors is carrying full load. Similarly for Fig. 1 the ampere turns of the series field windings 26 and 27 are adjusted in accordance with the machine capacities so that when each motor is carrying full load these field windings neutralize each other.

While I have shown a particular embodiment of my invention it will be understood of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. In a system of distribution, the combination with a plurality of mechanically connected motors, of means for exciting said motors, voltage producing means responsive to the difference in load current of said motors for producing a corrective component of excitation on each of said machines in a direction to cause the load division between said machines to remain at a substantially constant predetermined value.

2. The combination with a pair of mechanically connected motors, of means for exciting said motors, means for increasing the excitation of one motor while decreasing the excitation of said other motor, and a generator responsive to differences in load current between said motors for controlling said last mentioned means, whereby a predetermined ratio of load is automatically maintained between said motors.

3. The combination with a pair of mechanically connected motors, field windings on each of said motors providing for the excitation thereof, additional field windings on one motor arranged when energized to increase the excitation of said motor, and field windings on said other motor arranged to decrease said excitation when energized, and means responsive to the differences in load current between said motors for energizing said field windings, whereby the load division between said motors is maintained substantially constant.

4. A pair of parallel mechanically connected direct current motors, field windings for each of said motors for exciting the same, an additional field winding on one motor arranged when energized to increase the excitation thereof, and an additional field winding on said other motor arranged to decrease the excitation thereof, an auxiliary generator for energizing said additional windings, a pair of field windings on said auxiliary generator, connections for one of said windings for connecting it in series with the armature of one motor, and connections for said other winding for connecting it in series with the armature of said other motor, whereby said auxiliary generator is caused to produce a voltage proportional to the difference in current flow between said windings to maintain a substantially constant load division between said motors.

5. A pair of parallel mechanically connected direct current motors each having commutating windings in series with its armature, field windings on each of said motors for exciting the same, additional field windings on each of said motors arranged to respectively increase or decrease the excitation of its particular motor, and means responsive to the difference in potential drop caused by the flow of current through said commutating windings for energizing said additional field windings whereby the load division between said motors is maintained constant.

6. A plurality of parallel mechanically connected direct current motors each having its compensating windings connected in series with its armature, means for exciting said motors, field windings on each of said motors arranged to respectively increase or decrease the excitation of its particular motor, a generator connected to said field windings, means responsive to the difference in potential drop across said compensating fields for exciting said generator thereby causing said motors to shift their load until a predetermined load division is obtained.

In witness whereof I have hereunto set my hand.

BRUCE D. MICKEY.